C. H. BELKNAP.
COVER FASTENER.
APPLICATION FILED DEC. 28, 1920.
1,409,815.
Patented Mar. 14, 1922.
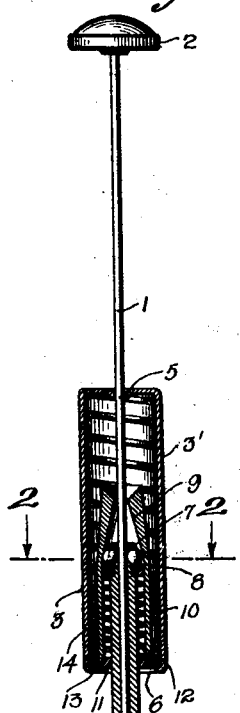
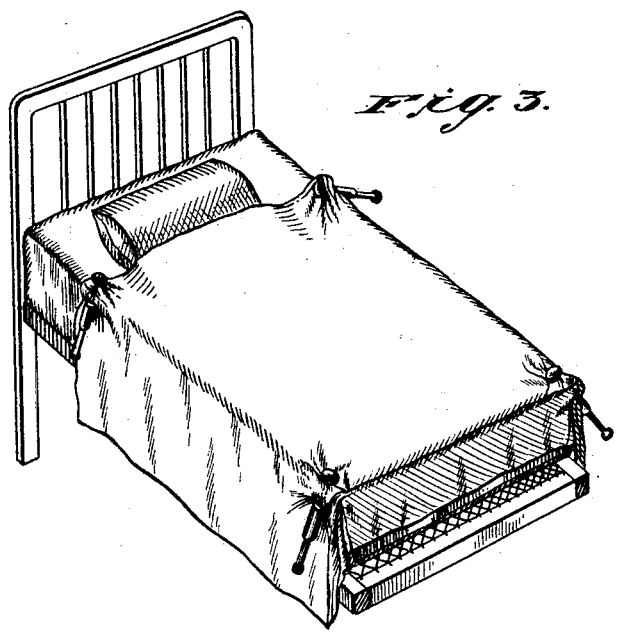
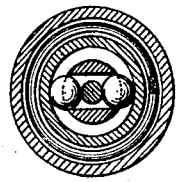
WITNESSES
H. C. Helbig
A. L. Kitchin
INVENTOR
CHARLES H. BELKNAP
BY Munn & Co
ATTORNEYS

UNITED STATES PATENT OFFICE.

CHARLES H. BELKNAP, OF BROOKLYN, NEW YORK.

COVER FASTENER.

1,409,815.  Specification of Letters Patent.  Patented Mar. 14, 1922.

Application filed December 28, 1920. Serial No. 433,725.

*To all whom it may concern:*

Be it known that I, CHARLES H. BELKNAP, a citizen of the United States, and a resident of the city of New York, borough of Brooklyn, in the county of Kings and State of New York, have invented a new and Improved Cover Fastener, of which the following is a full, clear, and exact description.

This invention relates to fastening devices and particularly to an improved fastening device especially adapted for fastening or pinning in position bed clothing and has for an object to provide an improved construction which is simple, strong and effective.

Another object of the invention is to provide a fastening device for bed covers wherein the fastening member is allowed a yielding movement so as to give when there is a pull on the covers.

A further object of the invention is to provide a fastening device for bed covers wherein a pin is used as the principal fastening member and means clasped thereto formed so as to allow the pin a reciprocation within certain limits.

In the accompanying drawings—

Figure 1 is a longitudinal vertical section through a fastener disclosing an embodiment of the invention.

Figure 2 is a transverse sectional view through Figure 1 on line 2—2.

Figure 3 is a perspective view showing part of a bed having a number of fasteners embodying the invention applied thereto.

Referring to the accompanying drawings by numeral, 1 indicates an ordinary pin which is comparatively long and which has a comparatively large head 2. This pin when in use is passed through the covers as shown in Figure 3 and usually part of the mattress. In order to prevent the accidental removal of the pin a locking structure 3 is clamped to the pin 1. A guard tube 4 extends from the locking structure 3 a sufficient distance to prevent the point of the pin 1 from engagement with anything. The locking structure 3 is provided with a casing 3' having an opening 5 sufficiently large to permit a free passage of the pin 1 and an opening 6 appreciably larger than the tube 4. The upper end of the tube 4 is provided with a conical-shaped fitting 7 having oppositely positioned apertures or passageways in which balls 8 are positioned which balls are free to move in a direction at right angles to the tube 4. This fitting or head to the tube 4 co-acts with the conical-shaped end 9 of a sleeve 10. Sleeve 10 has an end member 11 arranged in one end and held in place by friction, thread or in any desired manner. A spring 12 co-acts against the end 11 and the fitting or head 7 for tending to continually force the head upwardly into the conical-shape 9 so that the balls 8 will engage the walls of the end 9 and be thereby forced inwardly against the pin 1 so as to pinch the same and prevent accidental removal.

A ring 13 is secured to the sleeve 10 in any desired manner so as to move with the sleeve.

It will be noted that the bottom end of the casing 3' is bent over for preventing the ring 13 from escaping from the casing. Ring 13 acts as a shoulder against which a comparatively long spring 14 acts at one end while acting at the opposite end against the casing 3' for normally holding the parts as shown in Figure 1. In case the casing 3' is held stationary and the head 1 pulled in a direction longitudinally of the pin 1, balls 8 would grip the pin 1 and, consequently, sleeve 10, tube 4 and associated parts would move upwardly against the action of spring 14. This movement is, of course, limited by the distance between the upper end of the sleeve 10 and the upper end of the casing 3 but is sufficient to give a yielding action when a child pulls on the covering which is fastened by the pin 1. Very small children oftentimes in turning over at night, dislocate the covers to such an extent as to become almost uncovered and, consequently, the covering will not act in its proper capacity. To prevent this two or more fastening devices embodying the invention may be used as shown in Figure 3. This will permit a child to turn over and pull the covering to a certain extent which will yield by reason of the spring 14 but will not permit the covering to be entirely kicked or thrown off as sometimes done when no fastening means are provided.

What I claim is:—

1. A cover fastener comprising a pin, a tube for receiving said pin, a head connected with one end of said tube provided with a transverse passage-way and a pair of balls arranged in said transverse passage-way, said head having a passage-way in line with the tube so that said pin may extend through said head into said tube, a sleeve surrounding the upper part of said tube formed with a cone-shaped end adapted to engage said balls and force the same against said pin, a spring acting against said sleeve and said head for causing a relative movement of the head and cone sufficient to cause the balls to be pressed against said pin, a casing surrounding said sleeve and part of said tube and a spring acting on said sleeve in one end of said casing allowing a resilient movement of the sleeve, tube and pin within certain limits.

2. A cover fastener of the character described comprising a pin, a tube for receiving said pin, a head carried by said tube provided with a plurality of openings extending radially, a vertical opening arranged in line with the tube and merging into said first-mentioned openings, a ball arranged in each of said first-mentioned openings, a cone-shaped member surrounding said head and acting against said balls for causing the same to pinch the pin extending through the head, a spring for causing said cone-shaped member to maintain the pressure against said balls, a casing surrounding said cone-shaped member and part of said tube and a spring acting against said casing and said cone-shaped member for resiliently holding the pin, cone-shaped member and tube in a given position.

CHARLES H. BELKNAP.